United States Patent [19]

Coutant

[11] 4,345,508
[45] Aug. 24, 1982

[54] CONTROL SYSTEM FOR SEQUENTIALLY ACTUATING FLUID ACTUATORS

[75] Inventor: Alan R. Coutant, Chillicothe, Ill.

[73] Assignee: Caterpillar Tractor Co., Peoria, Ill.

[21] Appl. No.: 230,969

[22] PCT Filed: Jun. 2, 1980

[86] PCT No.: PCT/US80/00684
§ 371 Date: Jun. 2, 1980
§ 102(e) Date: Jun. 2, 1980

[87] PCT Pub. No.: WO81/03526
PCT Pub. Date: Dec. 10, 1981

[51] Int. Cl.³ .................................................. F15B 11/20
[52] U.S. Cl. ......................................... 91/516; 91/517
[58] Field of Search .................. 60/484; 91/514, 516, 91/517, 518, 532, 513

[56] References Cited

U.S. PATENT DOCUMENTS

| | | | |
|---|---|---|---|
| 2,713,246 | 7/1955 | Dall | 91/514 |
| 3,217,726 | 11/1965 | Rohweder | 91/516 |
| 3,349,670 | 10/1967 | Bahl | 91/517 |
| 3,490,338 | 1/1970 | Faust | 91/517 |
| 3,934,742 | 1/1976 | Tennis | 91/518 |
| 3,944,035 | 3/1976 | McRay | 60/484 |
| 3,967,534 | 7/1976 | Cryder | 91/517 |
| 3,990,237 | 11/1976 | Van Gerpen | 60/484 |
| 3,998,111 | 12/1976 | Blake | 91/516 |
| 4,024,797 | 5/1977 | Johnson | 91/514 |
| 4,070,858 | 1/1978 | Hand | 60/484 |

*Primary Examiner*—Abraham Hershkovitz
*Attorney, Agent, or Firm*—John W. Grant

[57] ABSTRACT

The heretofore known transmission control systems providing automatic sequential engagement of the fluid clutches have valves directly controlled by the operator and are not readily convertible to be pilot operated. The present invention has a selector valve (31) movable between first and second positions for communicating a supply line (19) with first and second fluid clutches (11,12) respectively. A fluid actuated valve (44) is moved to a first position communicating a third fluid clutch (13) with a drain line (18) when the fluid pressure in a fluid chamber (61) thereof drops below a preselected value and to a second position communicating the supply line (19) with the third fluid clutch (13) when the fluid pressure in the fluid chamber (61) exceeds the preselected value. A dump valve (76) drops the fluid pressure in the chamber (61) below the preselected value in response to a momentary pressure drop in the supply line (19) upon moving the selector valve (31) between the first and second positions. An orifice (81) delays filling of the fluid chamber (61) until the selected one of the first and second clutches (11,12) is engaged. The elements of the control system are fluid actuated and are, in effect, pilot operated.

8 Claims, 1 Drawing Figure

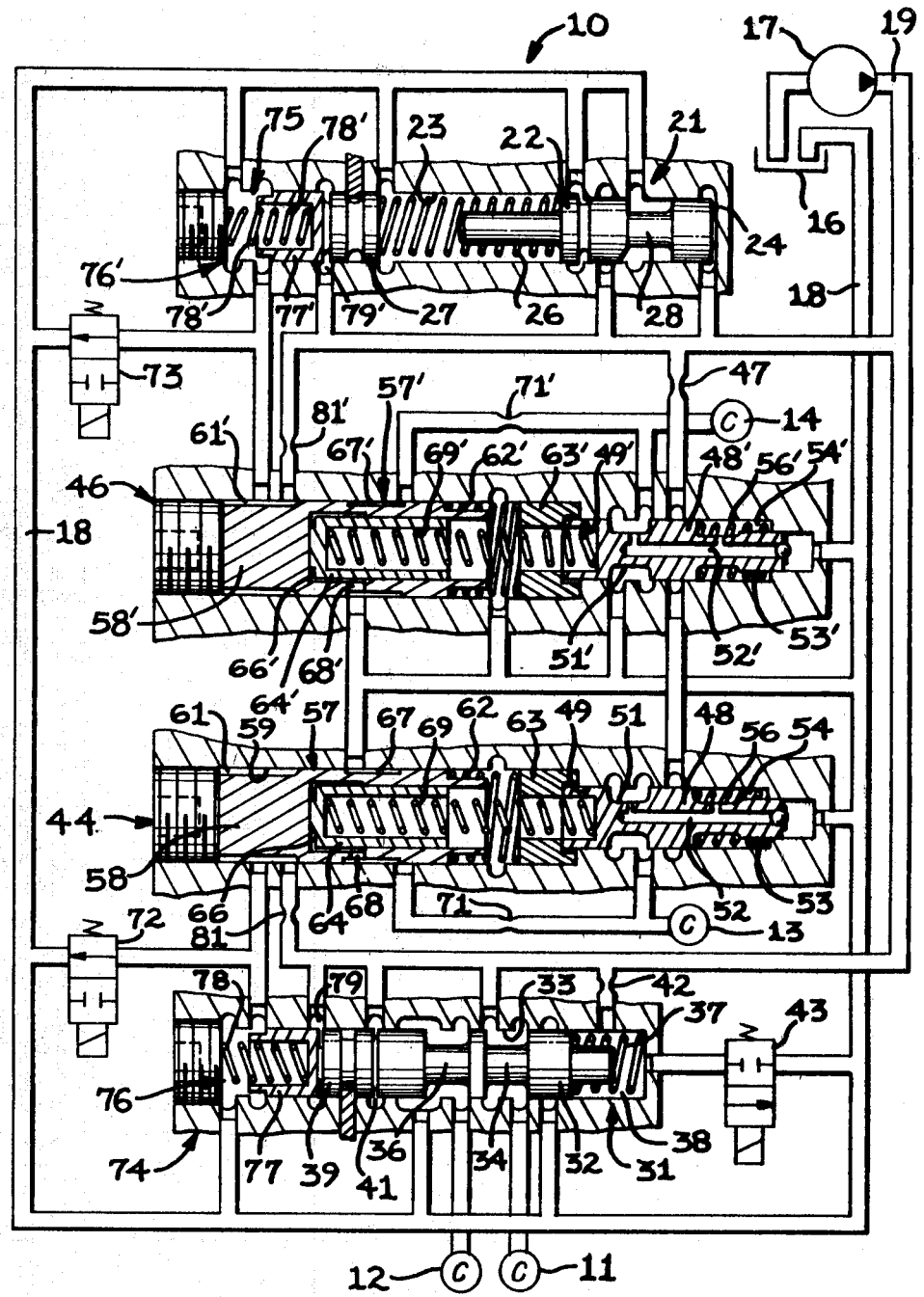

CONTROL SYSTEM FOR SEQUENTIALLY ACTUATING FLUID ACTUATORS

TECHNICAL FIELD

This invention relates generally to a control system and more particularly to a transmission control system which prevents the engagement of a fluid actuated clutch until one of a pair of fluid actuated clutches has been engaged.

BACKGROUND ART

Some hydraulic controls for power shift transmissions automatically provide for the sequential engagement of specific clutches after the transmission is shifted from one speed to another. For example, the system disclosed in U.S. Pat. No. 3,091,976 which issued to Johnson et al. on June 4, 1963 causes the speed clutches to be fully engaged before either one of the directional clutches is engaged so that the directional clutches absorb the shock of transmitting power through the transmission. With that system both the selector valve and directional control valve are directly controlled by the operator through a mechanical linkage. However, the control system of many of the industrial vehicles are being designed to incorporate pilot control circuits to control the shifting of the main control valves. Those pilot control circuits can be either totally hydraulic or a combination of electrical and hydraulic components. In either case, while the sequential engagement system taught by the above-noted patent has functioned satisfactory in the direct operator controlled arrangement in which it is used, that specific system is not readily convertible to a pilot operated control circuit.

The present invention is directed to overcoming one or more of the problems as set forth above.

DISCLOSURE OF THE INVENTION

In one aspect of the present invention a control system adapted for sequentially actuating first, second and third fluid actuators has a pump and a drain line connected to a tank, a supply line connected to the pump, and a selector valve connected to the supply line and to the first and second fluid actuators. The selector valve is movable between a first position at which the supply line is communicated with the first fluid actuator and a second position at which the supply line is communicated with the second fluid actuator. A fluid actuated valve is connected to the supply line, the drain line and the third fluid actuator and has a valve element movable between a first position at which the third fluid actuator is communicated with the drain line and a second position at which the supply line is communicated with the third fluid actuator, a spring biasing the valve element to the first position, and a fluid chamber at one end of the valve element. The valve element is moved to the second position in response to fluid pressure in the fluid chamber exceeding a preselected value and to the first position in response to the fluid pressure in the fluid chamber dropping below the preselected value. A means is provided for dumping the fluid in the fluid chamber of the fluid actuated valve to the drain line for dropping the fluid pressure in the fluid chamber below the preselected value responsive to shifting the selector valve between the first and second positions. An orifice connecting the supply line to the fluid chamber delays the filling of the fluid chamber with fluid until the selected one of the first and second fluid actuators is filled with fluid.

The control system of the present invention provides a system in which one of a pair of fluid actuated clutches is engaged prior to engagement of a third fluid actuated clutch so that the third clutch always absorbs the shock of transmitting power through the transmission when the transmission is shifted. The valves utilized to control the engagement and disengagement of the fluid actuated clutches are fluid actuated valves and are controlled by directing pressurized fluid thereto from the control system by selectively operable valves. The components of the system causing the selected one of the pair of clutches to be engaged prior to the engagement of the third clutch utilizes the characteristic of many power shift transmissions wherein the fluid pressure in the control system drops drastically due to the filling of the fluid actuated clutches each time the transmission is shifted.

BRIEF DESCRIPTION OF THE DRAWINGS

The drawing is a schematic representation of an embodiment of the present invention with portions shown in section for illustrative convenience.

BEST MODE FOR CARRYING OUT THE INVENTION

Referring now to the drawing, a control system is generally indicated by the reference numeral 10 and is adapted to control a plurality of fluid actuators 11, 12, 13 and 14 which can be, for example, fluid actuated clutches in a power shift transmission, not shown. In this particular embodiment, fluid actuators 11 and 12 represent first and second speed clutches while fluid actuators 13,14 represent forward and reverse clutches respectively of the transmission. The fluid actuated clutches 11-14 are engaged when pressurized fluid is directed thereto and are disengaged when the fluid is exhausted or vented therefrom.

The control system 10 includes a tank 16, a pump 17 and a drain line 18 connected to the tank 16, a supply line 19 connected to the pump 17 and a relief valve 21 positioned between the supply line 19 and drain line 18. The relief valve 21 limits the fluid pressure in the supply line 19 to a preselected maximum and includes a spool 22 slidably positioned within a bore 23 defining a fluid chamber 24 at one end of the spool 22. The chamber 24 is connected to the supply line 19 such that as the pressure in the supply line 19 increases the spool 22 is moved leftwardly against the bias of a spring 26 positioned between the spool 22 and a plug 27 fixedly positioned within the bore 23. The spool 22 moves leftwardly until metered communication is established between the supply and drain lines 19,18 and the force acting against the end of the spool 22 by the fluid pressure in the chamber 24 equals the biasing force of the spring 26.

A selector valve 31 is connected to the supply line 19, drain line 18 and to the fluid actuated clutches 11,12. The selector valve 31 includes a valve spool 32 slidably positioned within a bore 33 and is movable between first and second positions. At the first position the supply line 19 is communicated with the fluid actuated clutch 11 through an annular groove 34 on the valve spool 32 while the fluid actuated clutch 12 is communicated with the drain line 18 through an annular groove 36 on the valve spool 32. At the second position the supply line 19 is communicated with the fluid actuated clutch 12 through annular groove 36 while the fluid actuated clutch 11 is communicated with the drain line 18 through the annular groove 34. A spring 37 is positioned within a fluid chamber 38 at one end of the valve spool 32 and biases the valve spool 32 to the first position against a plug 39 fixedly positioned within the bore 33. Another fluid chamber 41 is formed between the valve spool 32 and the plug 39 and is continuously connected to the supply line 19.

The fluid chamber 38 is connected to the supply line 19 through an orifice 42. A solenoid actuated valve 43 is connected to the fluid chamber 38 and to the drain line 18 and is movable between a first position at which the fluid chamber 38 is blocked from communication with the drain line 18 and a second position at which the fluid chamber 38 is communicated with the drain line 18.

With the solenoid valve 43 in the disengaged or first position as shown both chambers 38 and 41 are subjected to the same fluid pressure from the supply line 19 and the spring 37 effectively biases the valve spool 32 to the first position. Moving the solenoid valve 43 to the second position reduces the fluid pressure in the chamber 38. The chamber 41 remains pressurized thereby causing the valve spool 32 to be shifted to the right to the second position.

A pair of fluid actuated valves 44,46 are connected to the fluid actuators 13,14 respectively, the supply line 19 through an orifice 47 and to the drain line 18. Inasmuch as the fluid actuated valves 44,46 are identical only the fluid actuated valve 44 will be described in detail with primed reference numerals applied to counterpart elements of the valve 46. The valve 44 includes a valve spool 48 slidably positioned in a bore 49. The valve spool 48 is movable between a first position at which the fluid actuated clutch 13 is in communication with the drain line 18 through an annular groove 51 on the valve spool 48 and a second position at which the fluid actuated clutch 13 is communicated with the supply line 19. A passageway 52 in the valve spool 48 connects the annular groove 51 with a reduced diameter portion 53 which is positioned in a chamber 54 surrounding the reduced diameter portion 53. A spring 56 is positioned in the chamber 54 and biases the valve spool 48 to the first position.

A control means 57 for moving the valve spool 48 to the second position against the bias of the spring 56 includes a selector piston 58 slidably positioned within a bore 59 defining a fluid chamber 61. A spring 62 is positioned between the selector piston 58 and an annular collar 63 which functions as a stop for establishing the first position of the valve spool 48. A load piston 64 is slidably positioned within a fluid chamber 66 of the selector piston 58. The chamber 66 is connected to an annular groove 67 in the exterior of the selector piston 58 through a radial port 68. A load spring 69 has one end in abutment with the load piston 64 and extends through the annular collar 63 with its other end abutting the valve spool 48. At the position shown the annular groove 67 and hence the chamber 66 is vented to the drain line 18. An orifice 71 connects the bore 59 with the fluid actuated clutch 13.

For an understanding of the present invention it will suffice to note that the valve spool 48 is moved to the second position in response to fluid pressure in the fluid chamber 61 exceeding a preselected value and to the first position in response to the fluid pressure in the fluid chamber 61 dropping below the preselected value. When the fluid pressure in the fluid chamber 61 exceeds the preselected value the selector piston 58 is moved to the right until it abuts the annular collar 63. Annular groove 67 will thus move out of communication with the drain line 18 but will remain in communication with the orifice 71. Simultaneously therewith the load piston 64 will move rightwardly to permit load spring 69 to overcome the opposed biasing force of the spring 56 to move the valve spool 48 to the second position to initiate filling of the fluid actuated clutch 13 with fluid. Upon filling of the fluid actuated clutch 13, fluid pressure will be transmitted through the passage 52 to the chamber 54 thereby providing additional force biasing the valve spool 48 to the left. At the same time, however, the pressurized fluid passes through the orifice 71 and into the control chamber 66. The pressurization of the control chamber 66 will function to urge load piston 64 rightwardly to modulate movement of the valve spool 48 against the biasing force of the spring 56 and the force generated by the fluid pressure in chamber 54 as the fluid pressure in the fluid actuated clutch 13 increases.

Each of a pair of solenoid actuated control valves 72,73 is connected to the control chambers 61,61' of the respective valves 44,46 and to the drain line 18. The solenoid valves 72,73 are each movable between a first position at which the respective fluid chamber 61,61' is vented to the drain line 18 and a second position at which the respective fluid chamber 61,61' is blocked from communication with the drain line 18.

Means 74 and 75 are provided for dumping the fluid chambers 61,61' of the fluid actuated valves 44,46 to the drain line 18 for dropping the fluid pressure in the fluid chambers 61,61' below the preselected value responsive to shifting the selector valve 31 between the first and second positions.

Since the dumping means 74,75 are structurally identical, only the means 74 will be described with primed numerals being applied to counterpart elements of the means 75. The dumping means 74 includes a fluid actuated dump valve 76 connected to the fluid chamber 61 of the fluid actuated valve 44 and the drain line 18. The dump valve 76 includes a dump spool 77 slidably positioned within the bore 33,23. The dump spool 77 is movable between a first position at which the fluid chamber 61 is vented to the drain line 18 and a second position at which the fluid chamber 61 is blocked from communication with the drain line 18. A spring 78 biases the dump spool 77 to the first position at which the dump spool 77 is in abutment with the plug 39,27 forming a fluid chamber 79. The fluid chamber 79 is connected to the supply line 19. The dump spool 77 is moved to the second position in response to pressurized fluid in the fluid chamber 79 exceeding the preselected value and to the first position in response to the fluid pressure in the fluid chamber 79 dropping below the preselected value.

A pair of orifices 81,81' connect the fluid chambers 61,61' of the fluid actuated valves 44,46 to the supply line 19 with the orifices 81,81' being of a size sufficient for delaying the filling of the fluid chambers 61,61' with fluid until the selected one of the fluid clutches 11,12 is filled with fluid upon movement of the valve spool 32 of selector valve 31 between the first and second positions.

INDUSTRIAL APPLICABILITY

The control system 10 is illustrated with the components at the positions which they would assume when the pump 17 is not operating. Operating the pump 17 introduces fluid into the supply line 19 and thus into fluid chambers 24, 38, 40 41, 61,61' and 79,79'. When the pressure in the supply line 19 exceeds the preselected value the dump spools 76,76' will move to their second position blocking communication between the chambers 61,61' and the drain line 18. However, with solenoid valves 72 and 73 in the first position shown, the chambers 61,61' remain vented to the drain line 18 so that the valve spools 48,48' of the valves 44 and 46 remain at their first positions. Also, with solenoid valve 43 in the first position shown fluid pressure in chamber 41 and 38 equalizes so that the selector valve 31 remains at its first position. Eventually the fluid pressure in the supply line 19 reaches the maximum value as established by the relief valve 21. The output capacity of the pump 17 is such that the maximum pressure value can be obtained even though fluid is being bled from the supply line 18 through one or more of the orifices 81,81' and 42.

To shift the transmission to, for example, forward drive the solenoid valve 72 is moved to its second position by an appropriate electrical signal. With fluid chamber 61 of valve 44 now totally blocked from communication with the drain line 18 fluid pressure builds therein above the preselected value shifting the valve spool 48 to its second position to direct pressurized fluid to the fluid clutch 13. The orifice 47 prevents the fluid pressure in the supply line 19 from dropping below the preselected value so that dump spools 76 remain at their second positions.

To shift the transmission from the first forward speed to the second forward speed the solenoid valve 43 is moved to its second position. The volumetric relationship of the pump 17 and each of the clutches 11, 12 is such that during the initial filling of one of the fluid clutches the fluid pressure in the supply line 19 momentarily drops below the preselected value. The momentarily pressure drop causes both dump valves 76,76' to move to their first positions. This immediately dumps the fluid from chamber 61 of the valve 44 to the drain line 18 causing the valve spool 48 to shift to the first position at which the fluid actuated clutch 13 becomes disengaged. When the fluid clutch 12 is filled the fluid pressure in the supply line 19 again rises above the preselected value causing the dump valves 76,76' to move back to their first positions blocking communication between the fluid chambers 61,61' and the drain line 18. The orifice 81 is sized to delay filling of the chamber 61 until the fluid clutch 12 is fully engaged. Subsequently the valve spool 48 will be moved to its second position to again reengage the fluid clutch 13.

In view of the foregoing it is readily apparent that the structure of the present invention provides an improved control system for sequentially actuating fluid actuators which includes fluid actuated components which are in effect pilot operated.

Other aspects, objects and advantages of this invention can be obtained from a study of the drawings, the disclosure and the appended claims.

What is claimed is:

1. In a control system (10) adapted for sequentially actuating first (11), second (12) and third (13) fluid actuators and having a tank (16), a pump (17) and a drain line (18) connected to the tank (16), a supply line (19) connected to the pump (17), and a selector valve (31) connected to the supply line (19) and to the first (11) and second (12) fluid actuators and being movable between a first position at which the supply line (19) is communicated with the first fluid actuator (11) and a second position at which the supply line (19) is communicated with the second fluid actuator (12), the improvement comprising:

a fluid actuated valve (44) connected to the supply line (19), the drain line (18), and the third fluid actuator (13) and having a valve element (48) movable between a first position at which the third fluid actuator (13) is communicated with the drain line (18) and a second position at which the supply line (19) is communicated with the third fluid actuator (13), a spring (56) biasing the valve element (48) to the first position, and a fluid chamber (61) at one end of the valve element (48), said valve element (48) being moved to the second position in response to fluid pressure in the fluid chamber (61) exceeding a preselected value and to the first position in response to the fluid pressure in the fluid chamber (61) dropping below the preselected value;

means (74) for dumping the fluid in the fluid chamber (61) of the fluid actuated valve (44) to the drain line (18) for dropping the fluid pressure in the fluid chamber (61) below the preselected value responsive to moving the selector valve (31) between the first and second positions; and an orifice (81) connecting the supply line (19) to the fluid chamber (61) and being of a size sufficient for delaying the filling of the fluid chamber (61) with fluid until the selected one of the first and second fluid actuators (11,12) is filled with fluid.

2. The control system of claim 1 wherein said dumping means (74) includes a fluid actuated dump valve (76) connected to the fluid chamber (61) of the fluid actuated valve (44) and the drain line (18) and having a dump spool (77) movable between a first position at which the fluid chamber (61) of the fluid actuated valve (44) is vented to the drain line (18) and a second position at which the fluid chamber (61) of the fluid actuated valve (44) is blocked from communication with the drain line (18), a spring (78) biasing the dump spool (77) to the first position, and a fluid chamber (79) connected to the supply line (19), said dump spool (77) being moved to the second position in response to pressurized fluid in the fluid chamber (79) of the dump valve 76 exceeding the preselected value.

3. The control system of claim 2 including a control valve (72) connected to the fluid chamber (61) of the fluid actuated valve (44) and to the drain line (18) and being movable between a first position at which the fluid chamber (61) of the fluid actuated valve (44) is vented to the drain line (18) and a second position at which the fluid chamber (61) of the fluid actuated valve (44) is blocked from communication with the drain line (18).

4. The control system of claim 3 wherein said selector valve (31) includes a valve spool (32) movable to its second position in response to pressurized fluid and a spring biasing the valve spool (32) to the first position.

5. The control system of claim 4 wherein said selector valve (31) includes a first fluid chamber (41) at one end of the valve spool (32) and connected to the supply line (19), a second fluid chamber (37) at the other end of said valve spool (32), a restrictive orifice (42) connecting the supply line (19) to the second fluid chamber (38), and including a control valve (43) connected to the second fluid chamber (38) and to the drain line (18) and being movable between a first position at which the second fluid chamber (38) is blocked from communication with the drain line (18) and a second position at which the second fluid chamber (38) is vented to the drain line (18).

6. The control system of claim 5 including a fourth fluid actuator (14), a second fluid actuated valve (46) connected to the supply line (19), the drain line (18) and the fourth fluid actuator (14), said second fluid actuated valve (46) having a valve element (48') movable between a first position at which the fourth fluid actuator (14) is communicated with the drain line (18) and a second position at which the supply line (19) is communicated with the fourth fluid actuator (14), a spring (56') biasing the valve element (48') to the first position, and a fluid chamber (61') at one end of the valve element (48').

7. The control system of claim 6 including means (75) for dumping the fluid in the fluid chamber (61') of the second fluid actuated valve (46) to the drain line (18) for dropping the fluid pressure in the fluid chamber (61') below the preselected value responsive to shifting the selector valve (31) between the first and second positions, and an orifice (81') connecting the supply line (19) to the fluid chamber (61') of the fluid actuated valve (46) and being of a size sufficient for delaying the filling of the fluid chamber (61') of the second fluid actuated valve (46) with fluid until the selected one of the first and second fluid actuators (11,12) is filled with fluid.

8. The control system of claim 7 including a control valve (73) connected to the fluid chamber (61') of the second fluid actuated valve (46) and to the drain line (18) and being movable between a first position at which the fluid chamber (61') of the second fluid actuated valve (46) is vented to the drain line (18) and a second position at which the fluid chamber (61') of the fluid actuated valve (46) is blocked from communication with the drain line (18).

* * * * *